(12) United States Patent
Thomas et al.

(10) Patent No.: US 10,429,581 B1
(45) Date of Patent: Oct. 1, 2019

(54) POLARIZATION SPLITTERS BASED ON STACKED WAVEGUIDES

(71) Applicant: GLOBALFOUNDRIES Inc., Grand Cayman (KY)

(72) Inventors: Abu Thomas, Brookline, MA (US); Yusheng Bian, Ballston Lake, NY (US); Ajey Poovannummoottil Jacob, Watervliet, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/189,125

(22) Filed: Nov. 13, 2018

(51) Int. Cl.
*G02B 6/12* (2006.01)
*G02B 6/126* (2006.01)
*G02B 6/13* (2006.01)
*G02B 6/293* (2006.01)

(52) U.S. Cl.
CPC ......... *G02B 6/12007* (2013.01); *G02B 6/126* (2013.01); *G02B 6/13* (2013.01); *G02B 6/29344* (2013.01); *G02B 2006/1215* (2013.01); *G02B 2006/12061* (2013.01)

(58) Field of Classification Search
CPC ...... G02B 6/12007; G02B 6/13; G02B 6/126; G02B 6/29344; G02B 2006/12061; G02B 2006/1215
See application file for complete search history.

(56) References Cited

U.S. PATENT DOCUMENTS

| | | | | |
|---|---|---|---|---|
| 6,768,828 | B2 * | 7/2004 | Gill | G02B 6/12007 385/129 |
| 6,949,392 | B2 * | 9/2005 | Gill | G02B 6/12007 427/255.37 |
| 9,547,131 | B1 | 1/2017 | Lin | |
| 2004/0087049 | A1 * | 5/2004 | Gill | G02B 6/12007 438/31 |
| 2004/0201026 | A1 * | 10/2004 | Gill | G02B 6/12007 257/79 |

OTHER PUBLICATIONS

Chheang et al., "Compact polarizing beam splitter based on a metal-insulator-metal inserted into multimode interference coupler", published Aug. 23, 2013 in vol. 21, No. 18 | Optics Express 20880.

Sun et al., "Realization of an ultra-compact polarization beam splitter using asymmetric MMI based on silicon nitride / silicon-on-insulator platform", vol. 25, No. 7 | Apr. 3, 2017 | Optics Express 8296.

Dai et al., "Novel concept for ultracompact polarization splitter-rotator based on silicon nanowires", May 23, 2011 / vol. 19, No. 11 / Optics Express 10940.

(Continued)

*Primary Examiner* — Andrew Jordan
(74) *Attorney, Agent, or Firm* — Thompson Hine LLP (57) ABSTRACT

Structures for a polarization splitter and methods of forming a polarization splitter. A multi-mode interference region includes a first waveguide and a second waveguide arranged in a stack over the first waveguide. First and second input ports are connected with the multi-mode interference region. First and second output ports are connected with the multi-mode interference region.

20 Claims, 5 Drawing Sheets

(56) References Cited

OTHER PUBLICATIONS

Ding et al., "Wideband polarization splitter and rotator with large fabricationtolerance and simple fabrication process", Apr. 15, 2013 / vol. 38, No. 8 / Optics Letters.

Yang et al., "Ultrashort Polarization Splitter Using Two-Mode Interference in Silicon Photonic Wires", IEEE Photonics Technology Letters, vol. 21, No. 7, Apr. 1, 2009.

Guan et al., "Extremely small polarization beam splitter based on a multimode interference coupler with a silicon hybrid plasmonic waveguide", Jan. 15, 2014 / vol. 39, No. 2 / Optics Letters.

Sun et al., "Compact and broadband polarization beam splitter based on a silicon nitride augmented low-index guiding structure", vol. 41, No. 1 / Jan. 1, 2016 / Optics Letters.

\* cited by examiner

POLARIZATION SPLITTERS BASED ON STACKED WAVEGUIDES

BACKGROUND

The present invention relates to photonics chips and, more specifically, to structures for a polarization splitter and methods of forming a polarization splitter.

Photonics chips are used in many applications and systems including, but not limited to, data communication systems and data computation systems. A photonics chip integrates optical components, such as waveguides and bends, and electronic components, such as field-effect transistors, into a unified platform. Layout area, cost, and operational overhead, among other factors, may be reduced by integrating both types of components on a single photonics chip.

The optical components of a photonics chip may include polarization splitters that divide optical signals received at a single port into its orthogonal linear polarizations that are output through a pair of ports for individual processing in the following circuit. Conventional polarization splitters have a large footprint because the output ports are laterally spaced from the single input port by a gap that is filled by dielectric material. The large footprint, which arises from the gap and other factors, may hinder the ability to construct large-scale, high-performance heterogeneous photonics chips.

Improved structures for a polarization splitter and methods of forming a polarization splitter are needed.

SUMMARY

In an embodiment of the invention, a structure is provided for a polarization splitter. The structure includes a multi-mode interference region having a first waveguide and a second waveguide arranged in a stack over the first waveguide, a first input port and a second input port connected with the multi-mode interference region, and a first output port and a second output port connected with the multi-mode interference region.

In an embodiment of the invention, a method is provided for forming a structure for a polarization splitter. The method includes forming a multi-mode interference region having a first waveguide and a second waveguide arranged in a stack over the first waveguide, forming a first input port and a second input port connected with the multi-mode interference region, and forming a first output port and a second output port connected with the multi-mode interference region.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

With reference to FIGS. 1, 2, 2A, 2B and in accordance with embodiments of the invention, a structure 10 for a polarization splitter includes waveguides 12, 14, 16, 18, 20 having a core composed of single-crystal semiconductor material (e.g., single-crystal silicon), and waveguides 11, 13, 15, 17, 19 having a core composed of a dielectric material. The waveguides 12, 14, 16, 18, 20 may be arranged directly on a buried insulator layer 21 of a silicon-on-insulator (SOI) wafer. The buried insulator layer 21 may be composed of a dielectric material, such as silicon dioxide, and may be arranged over a substrate 23 (e.g., a silicon substrate). The waveguides 12, 14, 16, 18, 20 may be formed by patterning the single-crystal semiconductor material of a device layer of the SOI wafer with lithography and etching processes that form an etch mask over the device layer and etch the masked device layer with an etching process, such as reactive ion etching (ME). The etching process may be selected to stop on the buried insulator layer 21 after penetrating fully through the device layer. The buried insulator layer 21 may operate as a lower cladding providing confinement for the waveguides 12, 14, 16, 18, 20.

Figure 2:
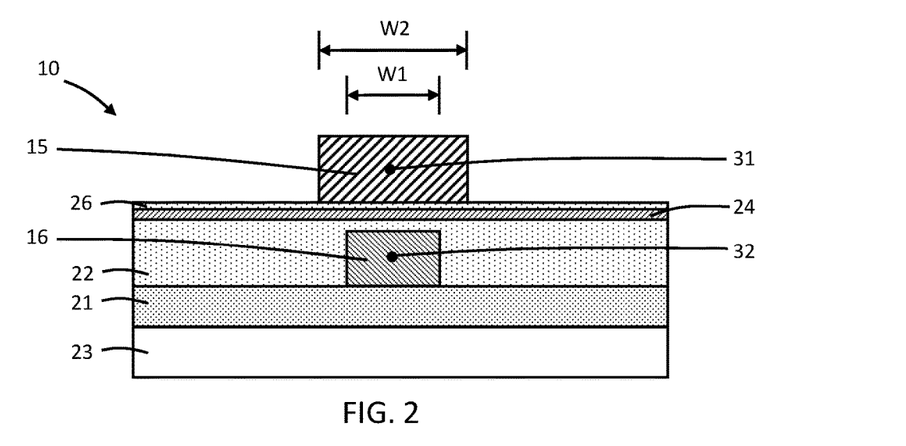
FIG. 2 is a cross-sectional view of the structure taken generally along line 2-2 in FIG. 1.
Figure 2A:
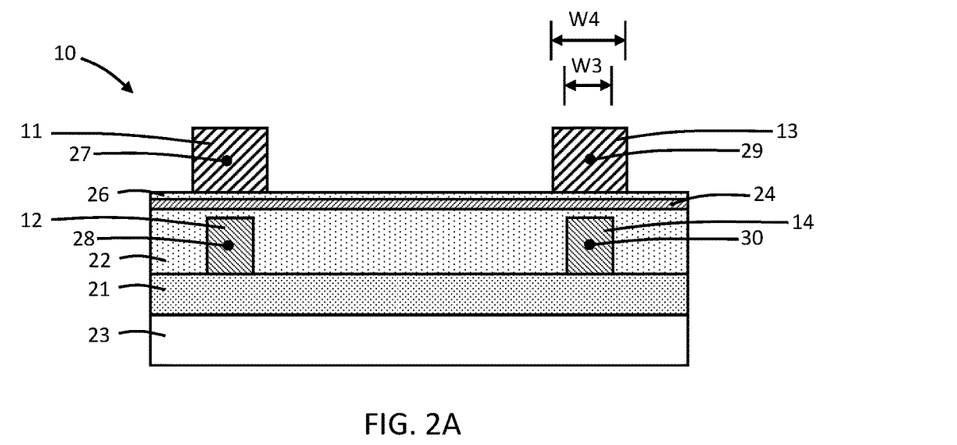
FIG. 2A is a cross-sectional view of the structure taken generally along line 2A-2A in FIG. 1.
Figure 2B:
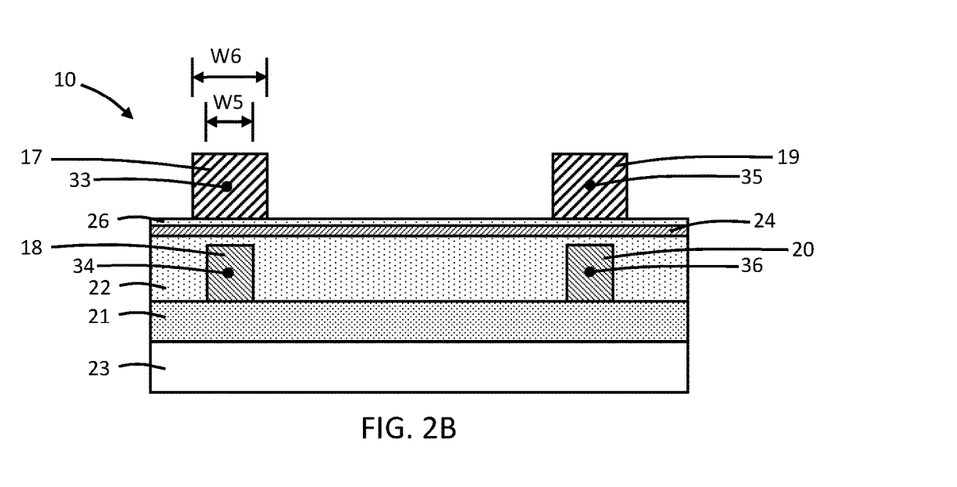
FIG. 2B is a cross-sectional view of the structure taken generally along line 2B-2B in FIG. 1.

A layer stack including dielectric layers 22, 24, 26 is formed over the waveguides 12, 14, 16, 18, 20. The lower dielectric layer 22 and the upper dielectric layer 26 may be composed of a dielectric material, such as silicon dioxide, deposited by atomic layer deposition (ALD) or chemical vapor deposition (CVD). The middle dielectric layer 24 may be composed of a different dielectric material, such as silicon nitride, deposited by atomic layer deposition or chemical vapor deposition. The thickness of the lower dielectric layer 22 may be selected such that the waveguides 12, 14, 16, 18, 20 are buried on all sides by the dielectric layer 22, which operates as cladding providing confinement.

The waveguides 11, 13, 15, 17, 19 are arranged over the dielectric layer 26, which places the waveguides 11, 13, 15, 17, 19 in a plane over a plane containing the waveguides 12, 14, 16, 18, 20. In an embodiment, the dielectric material of the waveguides 11, 13, 15, 17, 19 may be a nitride of silicon (e.g., silicon nitride) that is deposited by chemical vapor deposition over the dielectric layer 26 and then patterned by lithography and etching processes in which an etch mask is formed over the deposited layer and the masked deposited layer is etched with an etching process, such as reactive ion etching (RIE). The etching process may be selected to stop on the dielectric layer 26 after penetrating fully through the deposited layer of dielectric material.

The waveguides 12, 14, 16, 18, 20 may have a layout that provides respective stacked arrangements with the waveguides 11, 13, 15, 17, 19. The waveguide 11 is arranged directly over the waveguide 12 as a heterostructure having a stacked arrangement, and the stacked waveguides 11, 12 are aligned along respective longitudinal axes 27, 28 that may have a vertically-displaced arrangement with parallel alignment. The waveguide 13 is arranged directly over the waveguide 14 as a heterostructure having a stacked arrangement, and the stacked waveguides 13, 14 are aligned along respective longitudinal axes 29, 30 that may have a vertically-displaced arrangement with parallel alignment. The waveguide 15 is arranged directly over the waveguide 16 as a heterostructure having a stacked arrangement, and the stacked waveguides 15, 16 are aligned along respective longitudinal axes 31, 32 that may have a vertically-displaced arrangement with a parallel alignment.

The stacked arrangement of the waveguides 15, 16 provides a multi-mode interference region of the structure 10. The stacked arrangements of the waveguides 11, 12 and the stacked arrangements of the waveguides 13, 14 provide input ports or arms of the structure 10 that intersect the stacked arrangement of the waveguides 15, 16. The longitudinal axes 27, 28 and the longitudinal axes 29, 30 (shown diagrammatically by dot-dashed lines in FIG. 1) are inclined or angled relative to the longitudinal axes 31, 32 (also shown by dot-dashed lines in FIG. 1) of the waveguides 15, 16. The waveguide 11 and the waveguide 13 of the input arms are directly connected with the waveguide 15 of the multi-mode interference region, and the waveguide 12 and the waveguide 14 of the input arms are directly connected with the waveguide 16 of the multi-mode interference region. The direct connections permit an arrangement in which dielectric-filled gaps are not present (i.e., zero gaps) between either of the input arms and the multi-mode interference region, which contrasts with conventional arrangements for a polarization splitter.

The waveguide 17 is arranged directly over the waveguide 18 as a heterostructure having a stacked arrangement, and the stacked waveguides 17, 18 are aligned along respective longitudinal axes 33, 34 that may have a vertically-displaced arrangement with parallel alignment. The waveguide 19 is arranged directly over the waveguide 20 as a heterostructure having a stacked arrangement, and the stacked waveguides 19, 20 are aligned along respective longitudinal axes 35, 36 that may have a vertically-displaced arrangement with parallel alignment. The stacked arrangements of the waveguides 17, 18 and the stacked arrangements of the waveguides 19, 20 provide output ports or arms of the structure 10 that intersect the stacked arrangement of the waveguides 15, 16 on an opposite side of the multi-mode interference region from the input arms defined by the stacked arrangements of the waveguides 11, 12 and the stacked arrangements of the waveguides 13, 14. The waveguide 17 and the waveguide 19 of the output arms are directly connected with the waveguide 15 of the multi-mode interference region, and the waveguide 18 and the waveguide 20 of the output arms are directly connected with the waveguide 16 of the multi-mode interference region. The longitudinal axes 33, 34 (shown diagrammatically by dot-dashed lines in FIG. 1) of the waveguides 17, 18 and the longitudinal axes 35, 36 (shown diagrammatically by dot-dashed lines in FIG. 1) of the waveguides 19, 20 are inclined or angled relative to the longitudinal axes 31, 32 of the waveguides 15, 16.

The waveguides 12, 14, 16, 18, 20 may be patterned to have a width that is greater than the width of the waveguides 11, 13, 15, 17, 19 such that the waveguides 11, 13, 15, 17, 19 are respectively arranged inside the opposite side edges of the overlying waveguides 12, 14, 16, 18, 20. In particular, the width, W2, of the waveguide 16 may be greater than the width, W1, of the waveguide 15, the width, W4, of the waveguides 12, 14 may be greater than the width, W3, of the waveguides 11, 13, and the width, W6, of the waveguides 18, 20 may be greater than the width, W5, of the waveguides 17, 19.

Figure 1:
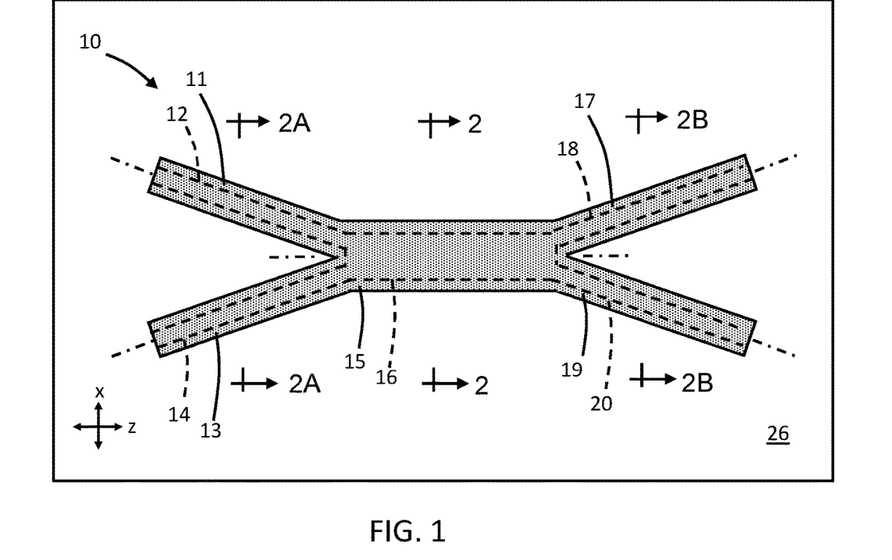
FIG. 1 is a top view of a photonics chip including a structure at an initial fabrication stage of a processing method in accordance with embodiments of the invention.

In the representative embodiment, the waveguides 12, 14 and the respective underlying waveguides 11, 13 in the stacks forming the input arms are straight. In an alternative embodiment, the waveguides 12, 14 and the respective underlying waveguides 11, 13 in the stacks may be bends, or include bends, having a given curvature. In the representative embodiment, the waveguides 18, 20 and the respective underlying waveguides 17, 19 in the stacks forming the input arms are straight. In an alternative embodiment, the waveguides 18, 20 and the respective underlying waveguides 17, 19 in the stacks may be bends, or include bends, having a given curvature.

The structure 10 has a symmetrical arrangement in which the identity of the input arms and the output arms may be swapped. In particular, the waveguides 18, 20 and the respective underlying waveguides 17, 19 in the stacks may provide the output arms of the structure 10, and the waveguides 12, 14 and the respective underlying waveguides 11, 13 in the stacks may provide the output arms of the structure 10 such that the direction of the propagation of the optical signals is changed.

The structure 10 may be optimized for operation in different wavelengths bands through the selection of the lengths and/or cross-sectional areas of the waveguides 15, 16 in the stack constituting the multi-mode interference region of the structure 10. For example, the structure 10 may be optimized for operation in the O-band (1310 nm) for use in data centers or in the C-band (1550 nm) for use in optical communications by merely changing its dimensions.

The structure 10, in any of its embodiments described herein, may be integrated as an on-chip optical component into a photonics chip 50 that includes electronic components and other types of optical components. The electronic components may include, for example, field-effect transistors that are fabricated by CMOS front-end-of-line processing using the device layer of the SOI wafer.

Figure 3:
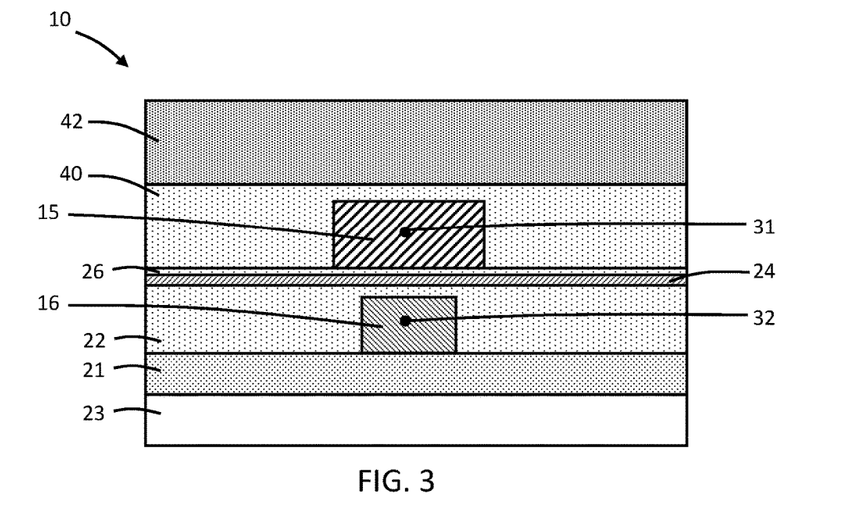
FIGS. 3, 3A, 3B are cross-sectional views of the structure at a fabrication stage of the processing method subsequent to FIGS. 2, 2A, 2B.
Figure 3A:
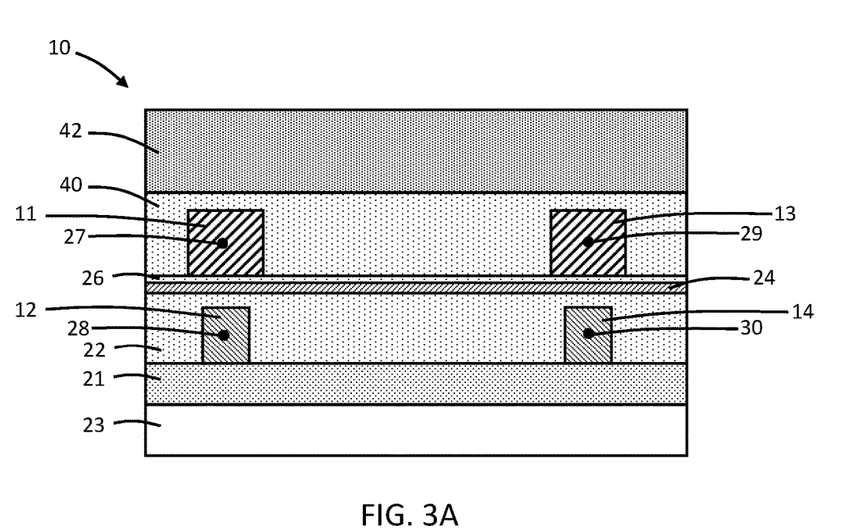
Figure 3B:
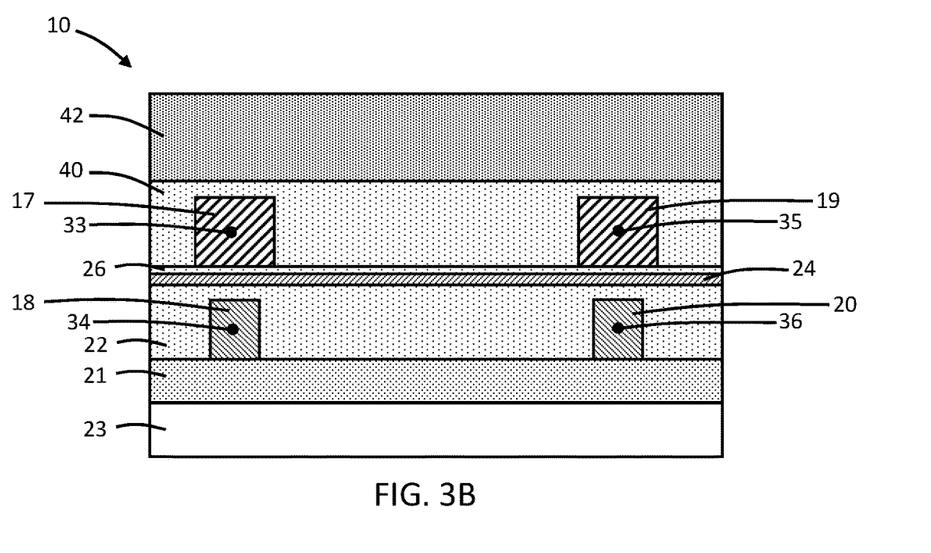

With reference to FIGS. 3, 3A, 3B in which like reference numerals refer to like features in FIGS. 2, 2A, 2B and at a subsequent fabrication stage, a dielectric layer 40 is formed over the waveguides 11, 13, 15, 17, 19 and over portions of the dielectric layer 26 that are not covered by the waveguides 11, 13, 15, 17, 19. The dielectric layer 40 may be composed of a dielectric material, such as silicon dioxide, deposited by chemical vapor deposition. For example, the dielectric layer 40 may be composed of silicon dioxide deposited by chemical vapor deposition using ozone and tetraethylorthosilicate (TEOS) as reactants. The dielectric layer 40 may be an interlayer dielectric layer containing contacts that extend to electronic components on the photonics chip 50.

A back-end-of-line stack, generally indicated by reference numeral 42, may be formed over the dielectric layer 40. The back-end-of-line stack 42 may include one or more interlayer dielectric layers composed of one or more dielectric materials, such as a doped silicon oxide. The back-end-of-line stack 42 may also include metallization composed of, for example, copper, tungsten, or cobalt that may be arranged in the one or more interlayer dielectric layers.

In use, optical signals containing both a transverse electric (TE) component and a transverse magnetic (TM) component of different polarization than the transverse electric component may be received by either the input arm defined by the stacked waveguides 11, 12 or the input arm defined by the stacked waveguides 13, 14, and propagate through that input arm toward the multi-mode interference region defined by the stacked waveguides 15, 16. The fundamental mode of the structure 10 may be TM mode and the first higher-order mode of the structure 10 may be TE mode. The different polarization components of the optical signals are split within the multi-mode interference region of the structure 10 and transmitted individually from the multi-mode interference region to the different output arms of the structure 10. For example, after splitting, the component of the optical signals with one of the polarizations (e.g., the TM mode) may be output from the stacked waveguides 17, 18 constituting one of the output arms (i.e., the bar-port), and the component of the optical signals with the other of the polarizations (e.g., the TE mode) may be output from the stacked waveguides 19, 20 constituting the other of the output arms (i.e., the through-port) with minimal cross-talk.

Figure 4:
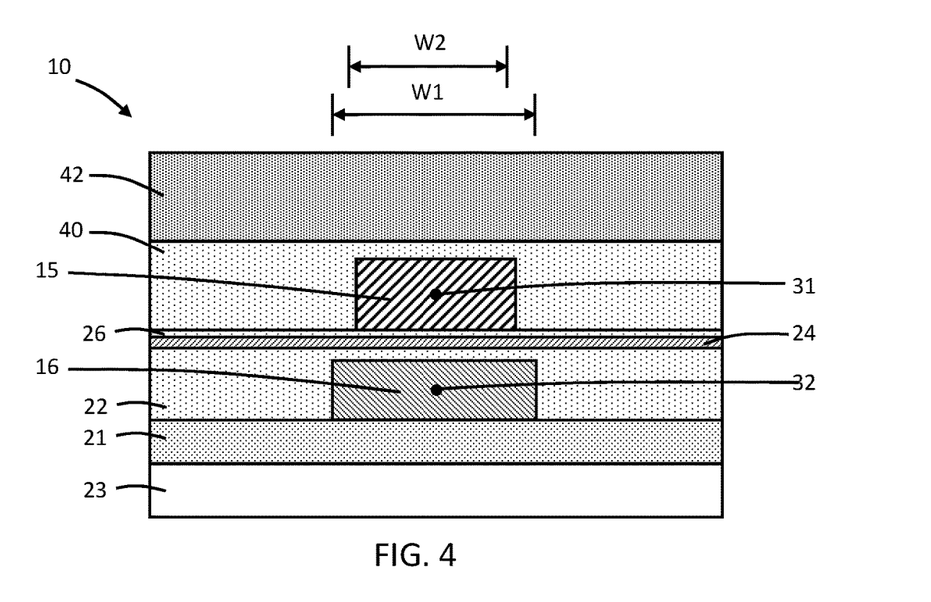
FIGS. 4, 4A, 4B are cross-sectional views similar to FIGS. 3, 3A, 3B of a structure in accordance with alternative embodiments of the invention.
Figure 4A:
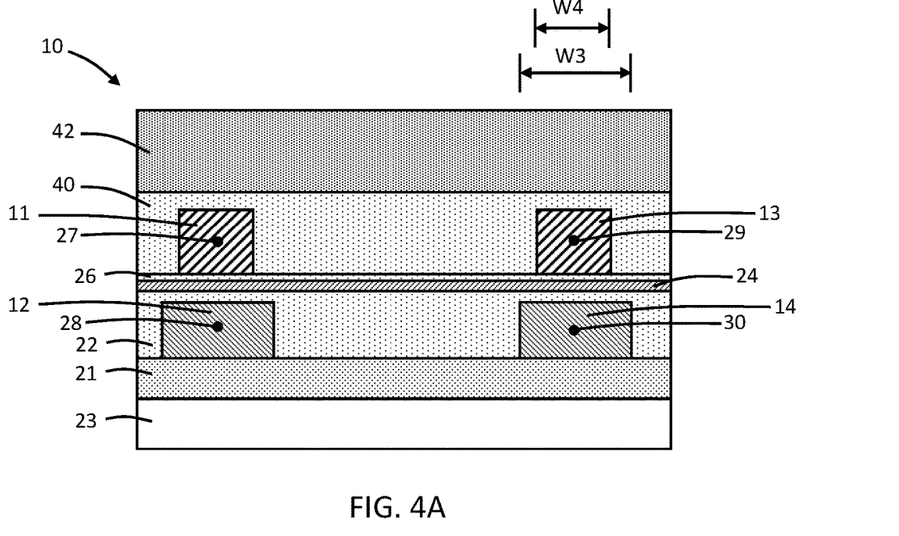
Figure 4B:
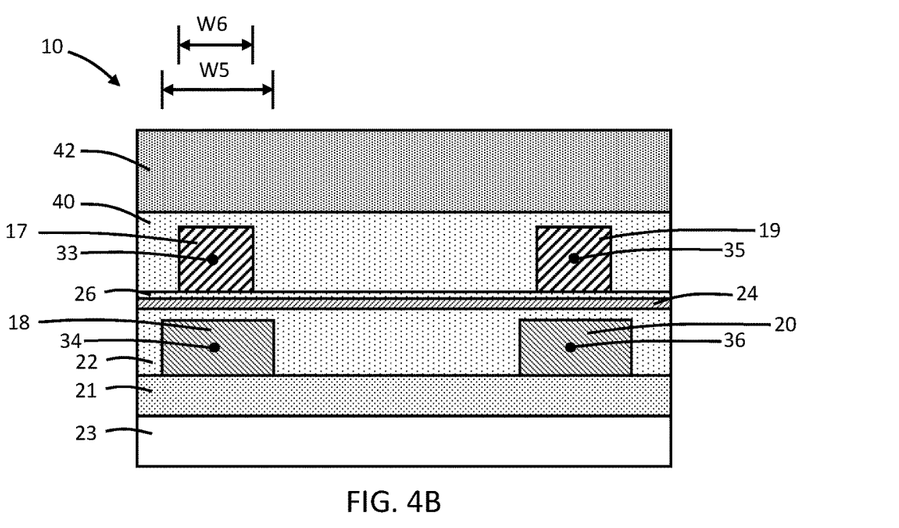

With reference to FIGS. 4, 4A, 4B in which like reference numerals refer to like features in FIGS. 3, 3A, 3B and in accordance with alternative embodiments, the waveguides 12, 14, 16, 18, 20 may be patterned to have a width that is less than the width of the waveguides 11, 13, 15, 17, 19. In particular, the width, W2, of the waveguide 16 may be less than the width, W1, of the waveguide 15, the width, W4, of the waveguides 12, 14 may be less than the width, W3, of the waveguides 11, 13, and the width, W6, of the waveguides 18, 20 may be less than the width, W5, of the waveguides 17, 19. The fundamental mode of the structure 10 with the swapped widths in the waveguide stacks may be TE mode and the first higher-order mode of the structure 10 may be TM mode.

The waveguides 12, 14 and the respective underlying waveguides 11, 13 in the stacks forming the input arms may be straight. In an alternative embodiment, the waveguides 12, 14 and the respective underlying waveguides 11, 13 in the stacks may be bends having a given curvature. In the representative embodiment, the waveguides 18, 20 and the respective underlying waveguides 17, 19 in the stacks forming the input arms are straight. In an alternative embodiment, the waveguides 18, 20 and the respective underlying waveguides 17, 19 in the stacks may be bends having a given curvature.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a polarization splitter, the structure comprising:
   a multi-mode interference region including a first waveguide and a second waveguide arranged in a first stack over the first waveguide;
   a first input port and a second input port connected with the multi-mode interference region; and
   a first output port and a second output port connected with the multi-mode interference region.

2. The structure of claim 1 wherein the first input port and the second input port each include a third waveguide and a fourth waveguide in a second stack over the third waveguide.

3. The structure of claim 2 wherein the first output port and the second output port each include a fifth waveguide and a sixth waveguide over the fifth waveguide.

4. The structure of claim 2 wherein the third waveguide of the first input port and the third waveguide of the second input port are directly connected with the first waveguide of the multi-mode interference region.

5. The structure of claim 4 wherein the fourth waveguide of the first output port and the fourth waveguide of the second output port are directly connected with the second waveguide of the multi-mode interference region.

6. The structure of claim 4 wherein the fourth waveguide of the first input port and the fourth waveguide of the second input port are directly connected with the second waveguide of the multi-mode interference region.

7. The structure of claim 2 wherein the first waveguide has a first width, the second waveguide has a second width that is less than the first width, the third waveguide has a third width, and the fourth waveguide has a fourth width that is less than the third width.

8. The structure of claim 2 further comprising:
   a first dielectric layer and a second dielectric layer arranged between the first waveguide and the second waveguide and arranged between the third waveguide and the fourth waveguide,
   wherein the first dielectric layer is comprised of an oxide of silicon, and the second dielectric layer is comprised of silicon nitride.

9. The structure of claim 1 wherein the first output port and the second output port each include a third waveguide and a fourth waveguide in a second stack over the third waveguide.

10. The structure of claim 9 wherein the third waveguide of the first output port and the third waveguide of the second output port are directly connected with the second waveguide of the multi-mode interference region.

11. The structure of claim 1 wherein the first waveguide has a first width, and the second waveguide has a second width that is less than the first width.

12. The structure of claim 1 wherein the first waveguide has a first width, and the second waveguide has a second width that is greater than the first width.

13. The structure of claim 1 wherein the first waveguide is comprised of single-crystal silicon, and the second waveguide is comprised of silicon nitride.

14. The structure of claim 1 wherein the first input port and the second input port are symmetrically arranged relative to the first output port and the second output port.

15. The structure of claim 1 further comprising:
a first dielectric layer and a second dielectric layer arranged between the first waveguide and the second waveguide,
wherein the first dielectric layer is comprised of an oxide of silicon, and the second dielectric layer is comprised of silicon nitride.

16. A method of forming a structure for a polarization splitter, the method comprising:
forming a multi-mode interference region including a first waveguide and a second waveguide arranged in a first stack over the first waveguide;
forming a first input port and a second input port connected with the multi-mode interference region; and
forming a first output port and a second output port connected with the multi-mode interference region.

17. The method of claim 16 wherein the first input port and the second input port each include a third waveguide and a fourth waveguide in a second stack over the third waveguide, and the first waveguide of the multi-mode interference region, the third waveguide of the first input port, and the third waveguide of the second input port are concurrently patterned from a layer of single-crystal silicon.

18. The method of claim 17 wherein the third waveguide of the first input port and the third waveguide of the second input port are directly connected with the first waveguide of the multi-mode interference region, and the fourth waveguide of the first input port and the fourth waveguide of the second input port are directly connected with the second waveguide of the multi-mode interference region.

19. The method of claim 16 wherein the first output port and the second output port each include a third waveguide and a fourth waveguide in a second stack over the third waveguide, and the first waveguide of the multi-mode interference region, the second waveguide of the multi-mode interference region, the fourth waveguide of the first output port, and the fourth waveguide of the second output port are concurrently patterned from a layer of silicon nitride.

20. The method of claim 19 wherein the third waveguide of the first output port and the third waveguide of the second output port are directly connected with the first waveguide of the multi-mode interference region, and the fourth waveguide of the first output port and the fourth waveguide of the second output port are directly connected with the second waveguide of the multi-mode interference region.

* * * * *